US008274999B2

(12) United States Patent
Shenoi et al.

(10) Patent No.: US 8,274,999 B2
(45) Date of Patent: Sep. 25, 2012

(54) METHOD AND APPARATUS FOR ANALYZING AND QUALIFYING PACKET NETWORKS

(75) Inventors: Kishan Shenoi, Saratoga, CA (US); George P. Zampetti, Livermore, CA (US); Lee Cosart, Palo Alto, CA (US)

(73) Assignee: Symmetricom, Inc., San Jose, CA (US)

( * ) Notice: Subject to any disclaimer, the term of this patent is extended or adjusted under 35 U.S.C. 154(b) by 258 days.

(21) Appl. No.: 12/830,268

(22) Filed: Jul. 2, 2010

(65) Prior Publication Data

US 2011/0122871 A1 May 26, 2011

Related U.S. Application Data

(60) Provisional application No. 61/263,264, filed on Nov. 20, 2009, provisional application No. 61/318,170, filed on Mar. 26, 2010.

(51) Int. Cl.
*H04J 3/06* (2006.01)
(52) U.S. Cl. ......... 370/503; 370/519; 370/517; 375/356
(58) Field of Classification Search ........................ None
See application file for complete search history.

(56) References Cited

U.S. PATENT DOCUMENTS

2008/0175275 A1* 7/2008 Garner et al. ................. 370/503
2009/0016475 A1* 1/2009 Rischar et al. ................ 375/356
2009/0122813 A1* 5/2009 Zhang ........................... 370/503

OTHER PUBLICATIONS

U.S. Appl. No. 12/558,297, "Method and Apparatus for Monitoring Packet Networks," filed Sep. 11, 2009.
U.S. Appl. No. 12/632,643, "Method and Apparatus for Finding Latency Floor in Packet Networks," filed Dec. 7, 2009.
Shenoi, Kishan. "Synchronization and Timing in Telecommunications," ISBN 1-4392-2632-6, Ch. 2, Sec. 2.3, pp. 39-69 (2009).
Symmetricom, Inc. "TimeMonitor Software," 2002.
Symmetricom, Inc. "TimeMonitor Suite: Advanced Synchronization Measurement Analysis Suite," 2010.

* cited by examiner

*Primary Examiner* — Duc C Ho
(74) *Attorney, Agent, or Firm* — Patterson & Sheridan, LLP

(57) ABSTRACT

Packet network performance is assessed using transit delay metrics and compliance masks generated at various evaluation nodes of the network. The evaluation nodes may employ network probes that make precise measurements of transit delays and thereby of transit delay variations. Based on the assessments, a master may be added to the network or relocated within the network, rate of timing packets generated by the master may be adjusted up or down, or oscillators used at the slaves may be upgraded.

19 Claims, 6 Drawing Sheets

METHOD AND APPARATUS FOR ANALYZING AND QUALIFYING PACKET NETWORKS

CROSS-REFERENCE TO RELATED APPLICATIONS

This application claims the benefit of U.S. Provisional Patent Application 61/263,264, filed Nov. 20, 2009, and U.S. Provisional Patent Application 61/318,170, filed Mar. 26, 2010. Both of the foregoing applications are incorporated by reference herein.

BACKGROUND OF THE INVENTION

1. Field of the Invention

Embodiments of the invention relate generally to time and frequency alignment systems operating over digital communications networks and, more specifically, to a method and a system for analyzing and qualifying packet networks.

2. Description of the Related Art

One of the more important requirements of a digital communication network is to support real-time communications applications, which typically require time or frequency alignment, or a combination of both. For example, time alignment may be used by real-time instrumentation systems gathering data at specific time intervals or operating machinery according to specific timing. Frequency alignment is typically useful in time division multiplex (TDM) systems and media streaming systems, which require fixed video or audio sample rates across multiple clients.

One approach known in the art that provides both time and frequency alignment involves generating (creating) an aligned time signal based on global positioning system (GPS) satellite timing signals, which are each held in precise alignment with a global clock reference. Using GPS signals to achieve time or frequency alignment is generally quite expensive and requires a client system to be able to receive the radio frequency (RF) signals from GPS satellites. In general, a more cost effective approach to time alignment is to transmit timing alignment information via a protocol that is operable within a given communications network.

In conventional TDM networks physical layer methods implement frequency alignment throughout the network, starting with a designated master clock system. The designated master clock system delivers (frequency) timing information via bit-timing (or symbol-timing) information associated with downstream physical communication links. In normal operation each system coupled to the master clock system replicates the master clock timing information to downstream systems by replicating physical layer timing from the master clock system to each downstream system. Each system within the TDM network receives (frequency) timing information and aligns local (frequency) timing to an upstream clock reference, thereby enabling every system within the TDM network to achieve frequency alignment.

While frequency alignment within conventional TDM networks is relatively straightforward, packet networks, such as networks based on the popular Ethernet industry standards, present time and frequency alignment challenges because packet networks are not conventionally designed to provide precise delivery time for data or precise timing at any lower protocol levels. A key difference is that the switching and multiplexing functions are not as deterministic as circuit switching and TDM, but have a statistical aspect as well. The statistical nature of switching and multiplexing adds a different notion of quality of service. Whereas error performance is always important, the notions of delay variation and available bandwidth now come into play. For a given packet flow, such as for a circuit-emulated service, a certain minimum "bit rate" may be specified along with a measure of how much more bandwidth can be made available, depending on the level of network congestion. A Service Level Agreement (SLA) between the network provider and an end-user would specify, among other items, the guaranteed (minimum) bit rate (or equivalent) as well as the upper limit to packet delay variation and other factors that could be in jeopardy in situations of network congestion.

Furthermore, packet networks typically involve multiple nodes that may store and forward data packets, potentially introducing significant transit delay variation between any two points. To generally overcome certain time alignment challenges inherent in packet networks, certain time alignment protocols based on the industry standard internet protocol (IP) have been developed and deployed. One IP-based time alignment protocol is known in the art as the Network Time Protocol (NTP). NTP is used for aligning time between a master time reference and one or more clients. Precision Time Protocol (PTP) is a second IP-based time alignment protocol for aligning one or more client devices to a master time reference. PTP is defined in detail within the IEEE 1588® standard.

Persons skilled in the art will understand that NTP, PTP, and any other time alignment protocol transmitted through a packet network must account for transit delay variation within the network. In fact, overall time alignment accuracy is generally determined by the ability of a system implementing time alignment to account for transit delay variation between a time reference and a clock aligning to the time reference.

Lightly loaded packet networks typically present relatively low transit delay variation, allowing IP-based alignment protocols such as NTP and PTP to easily achieve excellent accuracy relative to each protocol's specification. For example, in a lightly loaded gigabit Ethernet-based network, PTP can theoretically provide alignment of better than one hundred nanoseconds. However, conventional networks typically have a wide range of bandwidth loading conditions, which leads to large transit delay variations. This transit delay variation typically leads to degradation of time alignment accuracy.

Furthermore, network elements comprising the packet network may process sequential packets differently, depending on prevailing congestion conditions that result from increased bandwidth loading within the network. For example, a network element may forward all packets according to one delay profile until a congestion threshold is exceeded. Once the congestion threshold is exceeded, the network element may delay high priority packets, and drop low priority packets. If congestion on the network element drops below the congestion threshold, then the network element may stop delaying high priority packets and stop dropping low priority packets.

Frequency alignment between a frequency reference (master) and a frequency client (slave) may be disrupted by abrupt changes in transit delays resulting from one or more network elements switching form normal mode to congestion mode. Because conventional frequency alignment protocols presume transit delay does not change abruptly, a conventional client device commonly interprets a change in transit delay resulting from a network element changing between normal mode and congestion mode to be the result of a local frequency error. The conventional client device may adjust for the local frequency error, even though no adjustment is actually needed. Similarly, time alignment between a time reference (master) and a time client (slave) may also be disrupted by abrupt changes in transit delays resulting from one or more network elements switching from normal mode to congestion mode.

Thus, several factors, including network congestion and network element policies for packet processing, may contribute to greater transit delay variation in a packet network. Unfortunately, transit delay variation typically reduces accuracy and reliability of time and frequency alignment systems that conventionally depend on stability of transit delay within the packet network.

SUMMARY OF THE INVENTION

One or more embodiments of the invention provide a method and a system for analyzing and qualifying packet networks using: (1) slave devices or network probes for measuring transit delay and transit delay variations, and (2) suitable metrics and predetermined masks to establish whether the network can support the timing service at the desired level of performance at either the deployment stage or while the network is online. With the embodiments of the invention, efficient operation, management, administration, and provisioning of networks can be achieved.

A method of validating a network having one or more master clocks for packet-based timing transfer, according to an embodiment of the invention, includes the steps of transmitting timing packets throughout the network, receiving the timing packets at an evaluation node of the network, computing a transit delay characteristic of the network based on timing information contained in the received timing packets, generating a compliance mask for validating the network, and comparing the transit delay characteristic against the compliance mask and validating the network based on the comparison.

A method of deploying a network having one or more masters and a plurality of slaves that are synchronized to the masters, according to an embodiment of the invention, includes the steps of, at each of the slave locations, computing a transit delay metric and a compliance mask based on timing packets transmitted by the masters, and upgrading the network if, at one of the slave locations, the transit delay metric exceeds the compliance mask. Upgrading the network may be adding a master to the network, relocating a master within the network, or upgrading an oscillator used at one of the slaves.

A packet network according to an embodiment of the invention includes one or more master clocks, one or more slave clocks, a plurality of network elements between the master clocks and the slave clocks, and a network management system coupled to each of the master clocks, the slave clocks, and the network elements. The network management system, in this embodiment, is configured to generate transit delay metrics and compliance masks at the slave clocks for active monitoring of the packet network performance.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

In the present disclosure, it should be noted that the terms "time delay variation" and "packet delay variation" are used interchangeably.

Embodiments of the invention address the need to observe packet network segments and assess the potential performance of real-time services that traverse the segments. Very precise performance measurements of the transit delay and transit delay variation between two points in a packet network can be made using a packet probe that is described in U.S. patent application Ser. No. 12/558,297, filed on Sep. 11, 2009, the entire contents of which are incorporated by reference herein.

Other methods for establishing the transit delay may, however, be used, including a slave clock implementation for IEEE 1588® (Precision Time Protocol, PTP), which has various functional blocks required for performing the measurements. If a slave clock implementation is provided with a local clock that is synchronized to the sender (i.e., the PTP Master clock) then the PTP timestamps provide the requisite information to estimate the transit delay from master to slave implementation.

Measurement and monitoring of transit delay and delay variation can be used for several network management functions. One application is congestion monitoring. Certain metrics computed from the delay measurements can describe the level of congestion in the network and armed with this knowledge suitable network management actions can be taken such as routing traffic around islands of congested segments. A second application is the development of routing algorithms with "cost of routing" based not on number of hops (as in prior art) but on the ability of links to carry real-time traffic or traffic that is sensitive to transit delay variation such as services used for transport of timing. Examples of real-time traffic are VoIP (Voice over Internet Protocol), Video-over-IP, IPTV (Internet Protocol Television); examples of timing traffic are PTP (Precision Timing Protocol, i.e. IEEE 1588®) and NTP (Network Time Protocol). A third application, which is described in detail here is the prediction of the performance of a packet-based slave/client (included but not limited to PTP slave or NTP client) that is exchanging timing messages with a master/server across the measured packet network (segment). A fourth application is the prediction of the performance of clock recovery methods based on adaptive clock recovery (ACR) over the said network segment.

Figure 1:
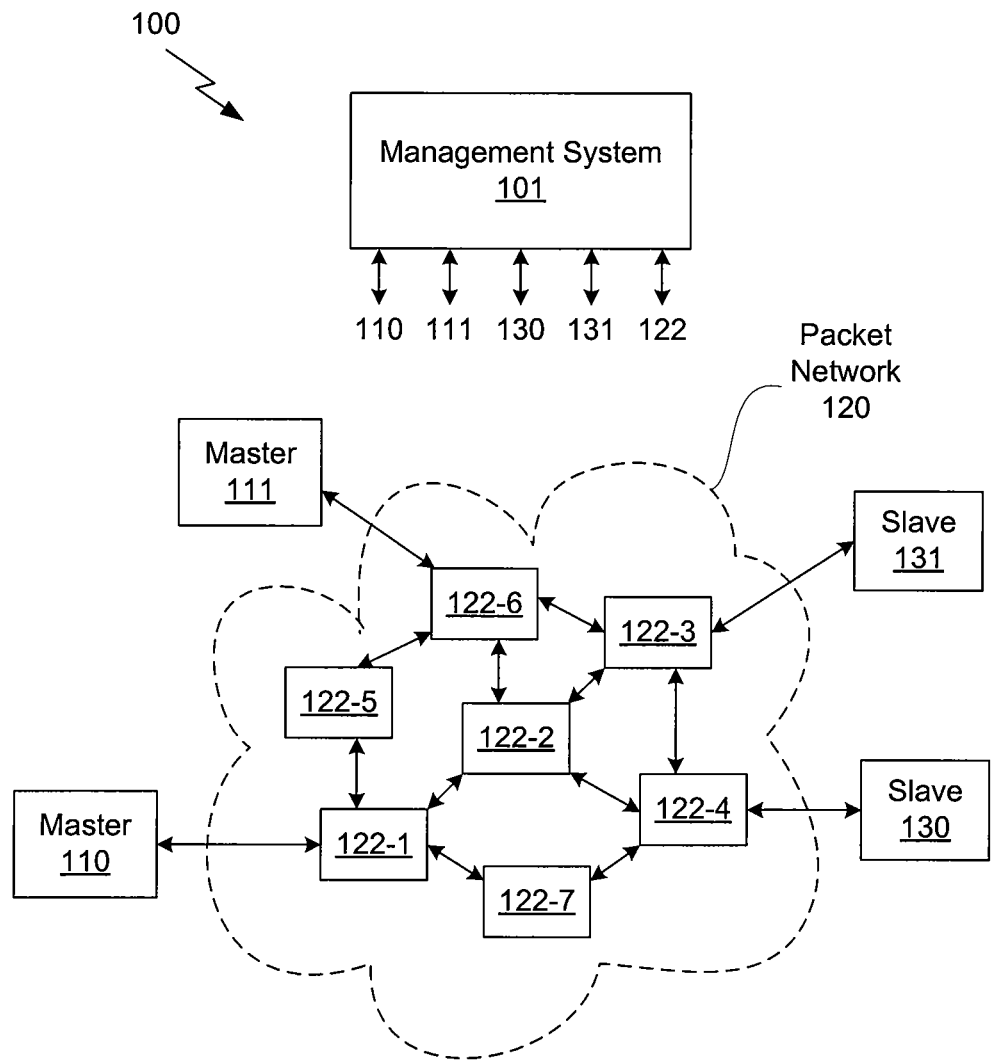
FIG. 1 illustrates a network system that may benefit from one or more embodiments of the invention.

FIG. 1 illustrates a network system 100 that may benefit from one or more embodiments of the invention. Network system 100 may include one or more master clocks and one or more slave clocks. In the embodiment illustrated in FIG. 1, network system includes two master clocks, namely master clock 110 and master clock 111, and two slave clocks, slave clock 130 and slave clock 131. The communication path between a master clock and a slave clock is through a packet network 120, which includes a plurality of network elements 122. Network system 100 is managed by a management system 101, which communicates with each of the master clocks, slave clocks, and network elements. Management system 101 is implemented as a computing device that executes software that carries out various network management functions under the control of a network system administrator.

Figure 2:
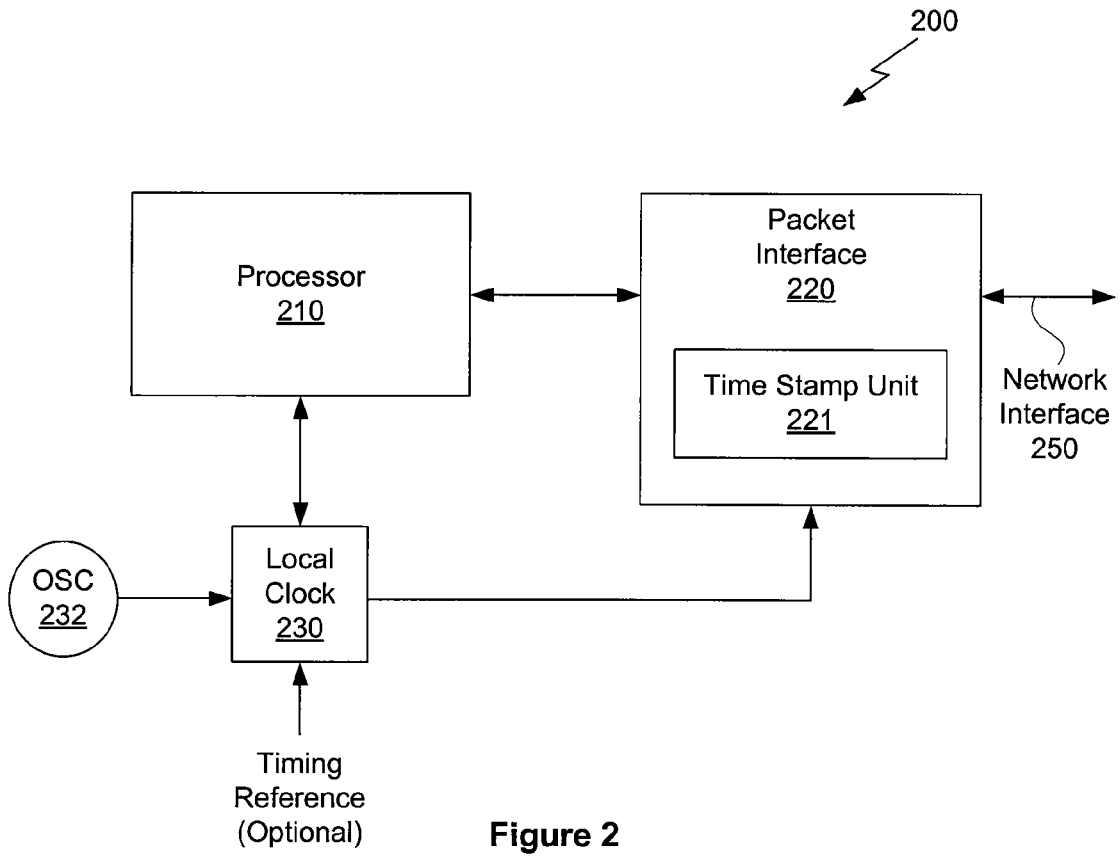
FIG. 2 illustrates one embodiment of a slave clock that can be used in the network system of FIG. 1.
Figure 3:
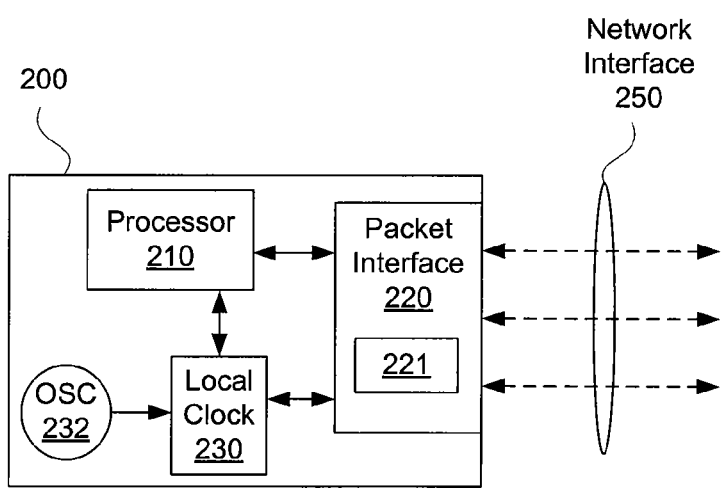
FIG. 3 illustrates another embodiment of a slave clock that can be used in the network system of FIG. 1.

FIG. 2 illustrates one configuration of a slave clock of FIG. 1. Slave clock 200 includes a processor 210, a packet interface 220 having a time stamp unit 221, a local clock 230, and a local oscillator 232. In this configuration, local clock 230 is driven by a local oscillator 232 and provides local time to processor 210 and time stamp unit 221. Packet interface 220 is coupled to packet network 120 via a network interface 250 and time stamps packets as they are received and transmitted via network interface 250. The time stamping function is carried out by time stamp unit 221 based on local time supplied by local clock 230. In one embodiment, packet interface 220 is a packet probe which is described in U.S. patent application Ser. No. 12/558,297. In other embodiments, packet interface 220 may be a packet interface that is used in conventional PTP slave clocks. Processor 210 is programmed to compute the various metrics and perform the analytics as described below, based on the timing information associated with the received packets. It is also possible for these computations to be performed in a separate computing device, such as a personal computer, though such computations are usually not in real-time and are performed on data collected and stored for batch-type processing. In some configurations of the slave clock, processor 210 is programmed to provide multiple virtual paths out to packet network 120. FIG. 3 is a schematic diagram that illustrates the different virtual paths from slave clock 200 to packet network 120.

In network system 100, the master clocks are coupled to highly accurate timing sources and are placed in the network in a distributed manner so that they can be accurate timing sources for the slave clocks. The alignment of a slave clock to a master clock may be performed in frequency and in time. In the embodiments of the invention described herein, any of the alignment procedures known in the art may be used. However, there are many possible routes between the master clock and the slave clock. Some routes may be better than others, so these routes are analyzed according to various metrics based on which the "best" route may be selected.

Figure 4:
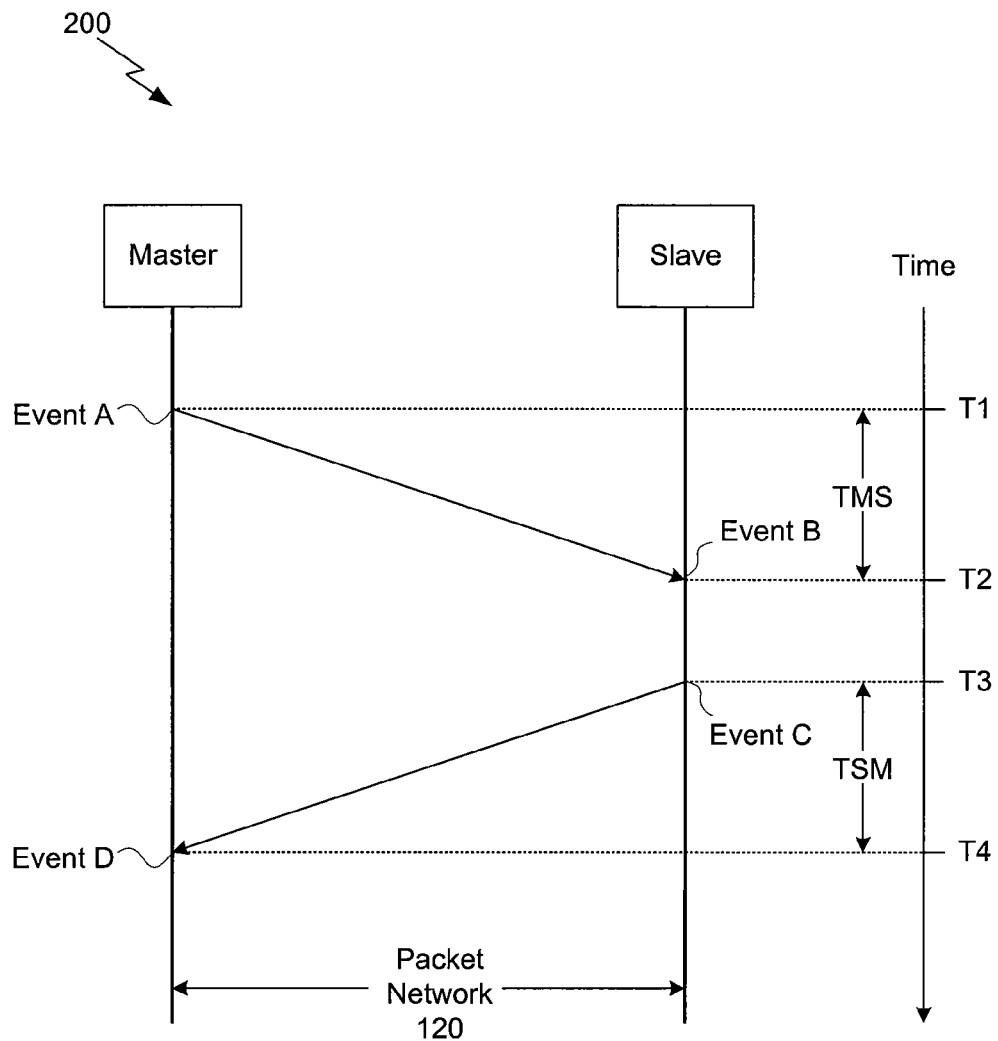
FIG. 4 illustrates relative timings of a timing packet transmitted between a master clock and a slave clock.

FIG. 4 illustrates relative timings of a timing packet transmitted between a master clock and a slave clock. At Event A, a first packet is transmitted by the master and time-of-departure is T1. At Event B, the first packet arrives at the slave that measures the time-of-arrival as t2; assuming that the slave time error is E, the actual time-of-arrival is T1=t2+E. At Event C, a second packet is transmitted by the slave that notes the time-of-departure is t3, and assuming that the slave time error is E, the actual time-of-departure is t3+E. At Event D, the second packet arrives at the master that measures time-of-arrival as T4. Such a two-way exchange of packets can provide information suitable for allowing the slave to align in time with the master (assuming that both sides have knowledge of the time stamps, which can be provided by management system 101). If the exchange of information is only one-way, from master to slave (referred to as the forward direction), the slave can still align its clock (frequency) with the master. One-way methods, where the time-stamped packets flow from slave to master can be employed provided the mechanism (e.g., management system 101) is available for the slave to obtain the results of the master measuring time-of-arrival at the master.

The two-way exchange involves one packet (message) in each direction, and they do not necessarily have to be consecutive as long as the time stamp information is communicated appropriately. In some instances, the rate at which packets are transmitted in the two directions can be different. Denoting by TMS and TSM, the transit delays between the master and slave and vice versa, the following equations can be established: T4=t3+E+TSM and T1=t2+E−TMS. In an actual time-transfer situation there are two equations with three unknowns, so it is common to assume reciprocity of transit delay between the two devices, thereby reducing the number of unknowns to 2 and therefore computing E, the slave time error.

Because of the fundamental statistical behavior of packet networks, the transit delays are not fixed and can vary from packet to packet. To counter this packet delay variation, as well as to account for any drift in the slave clock oscillator, the estimates of clock offset are made routinely and it is known that the mitigation of the deleterious effects of packet delay variation and oscillator drift is improved by using more frequent exchanges of timing packets.

For measurement and monitoring purposes, a probe device can be installed instead of a slave or in parallel with a slave. One example of a probe device is disclosed in U.S. patent application Ser. No. 12/558,297. If the probe has its own timing reference (e.g. GPS) and is therefore, by design, locked to the same reference as the master then, in the situation of a probe, the slave time error is moot and the two equations provide measurements of TMS and TSM, the transit delays between the master and the slave. If the probe does not have a common timing reference with the master but if it does have a high quality oscillator that, for the measurement period of interest, has sufficient stability for an accurate measurement to be made, such as an OCXO (oven controlled crystal oscillator) or a Rubidium atomic standard, then the probe can still establish the stability of the timing signal implicit in the time stamp exchange over the packet network segment.

Figure 5:
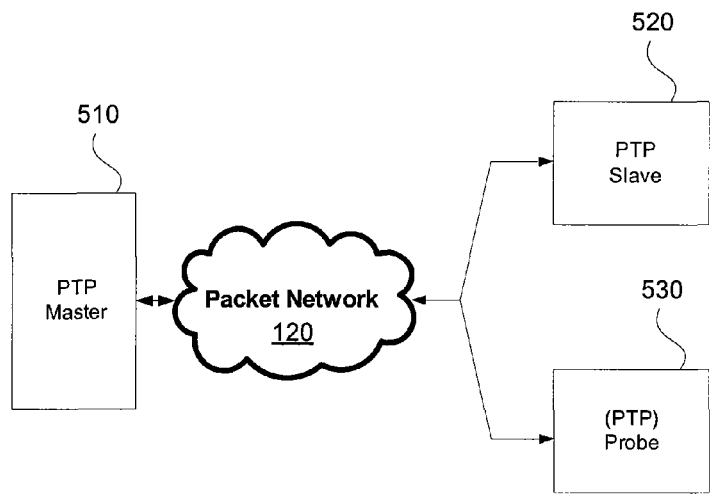
FIG. 5 illustrates a probe that is co-located with slave.

As shown in FIG. 5, if a probe 530, e.g., the probe described in U.S. patent application Ser. No. 12/558,297, is located at the same node of the network as a slave 520, the transit delay between the probe 530 and the master 510 will be statistically identical to the transit delay between the slave 520 and the master 510. A method that analyzes the performance of a slave clock as a function of the transit delay(s) and transit delay variation(s) is described below. With this method, the suitability of the network to support packet-based timing transfer can be established. This conceptualization is extendable to other scenarios including NTP, circuit emulation, voice-over-IP, video-over-IP, IPTV, and so on.

As mentioned above, measurements can be made at the pre-deployment stage, to qualify the capability of the packet network for timing delivery purposes. Using the probe device at the same location as the slave will permit the network configuration to be examined and analyzed to estimate what is the lowest packet rate (i.e., the rate at which timing packets are transmitted by the master clock) at which the slave clock will be able to function and meet the appropriate clock output specification. Operating at the lowest feasible rate implies that the network loading created by the PTP will be minimized. Network jitter can also be impacted by network loading and by traffic management techniques such as quality of service. These can also be analyzed and optimized using this device.

If the period associated with this nominal packet rate is denoted by $t_P$, measurements being made on a nominally uniform time grid comprised of measurements every $t_P$ units of time (e.g., $t_P$ seconds) can be considered. Arbitrarily assigning the index n=0 to the first measurement done in a testing interval of duration T seconds, there will be N samples of the transit delay where $T=N*t_P$. The measurements are organized as two sequences for the "S→M" and "M→S" directions. Having separate measurements for the two directions facilitates the isolation of problems and permits the observation of loading phenomena that are asymmetric (different in the two directions). These sequences are: $\{\Delta_{MS}(n); n=0, 1, \ldots, (N-1)\}$ and $\{\Delta_{SM}(n); n=0, 1, \ldots, (N-1)\}$ for the "M→S" and "S→M" directions, respectively. Analysis of these sequences provides valuable information on the performance of different networks and the overall network over the observation interval T (and sub-intervals thereof). Whereas it is not necessary to have an equal packet rate in the two directions, and whereas it is not a necessity for the packet rate to be equal for the invention to be applicable, it is sometimes convenient from the viewpoint of notation and explanation to assume that the rates in the two directions are equal. It is also not necessary for bi-directional flow to be present. The invention is applicable to uni-directional flow as well as bi-directional flow.

Embodiments of the invention employ masks and derivation of masks are described below. Specifically, for a given application, there are certain requirements that need to be met by the slave clock output. In one embodiment, these requirements are generally specified in terms of MTIE (Maximum Time Interval Error) or TDEV (Time DEViation) masks. These masks represent upper bounds on the MTIE or TDEV extracted from measurements of the clock output relative to a known good reference. Definitions of MTIE and TDEV are available in Chapter 2, Section 2.3 of Shenoi, K. *Synchronization and Timing in Telecommunications*, On Demand Publishing, ISBN 1-4392-2632-6 (2009), as well as definitions and explanations of related terms such as time interval error (TIE) and TIE sequences.

Figure 6:
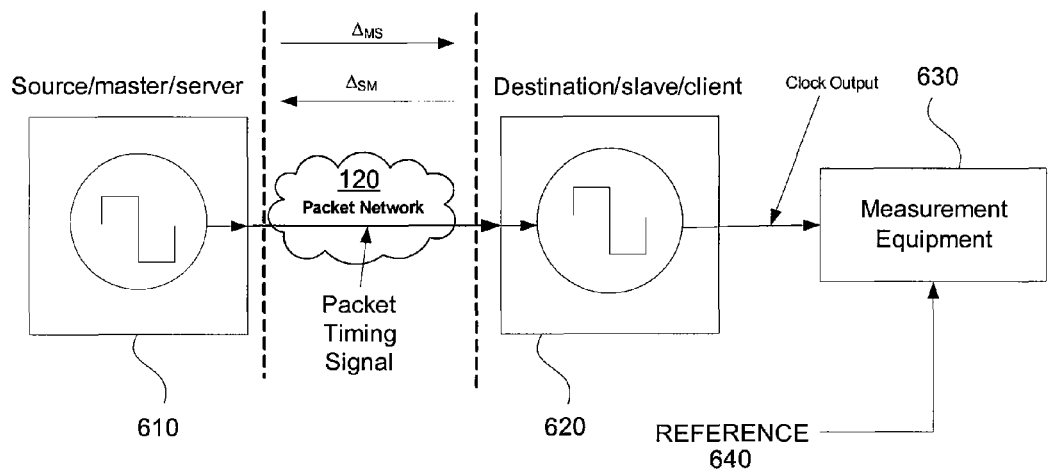
FIG. 6 illustrates a slave clock that is evaluated in accordance with one or more embodiments of the invention.

FIG. 6 illustrates a slave clock that is evaluated in accordance with one or more embodiments of the invention. The output of the slave clock 620 is a conventional clock signal and can be compared to a reference timing signal 640, which is provided by an accurate timing source such as a GPS timing source. The measurement equipment 630 consists of the actual hardware to make the TIE measurements as well as the software to extract the appropriate metric (MTIE or TDEV) and provide the results in graphical form together with the appropriate mask so it is clear whether the requirements have been complied with. The software to do this is commercially available from Symmetricom, Inc. under the product name, TimeMonitor Analyzer.

Figure 7:
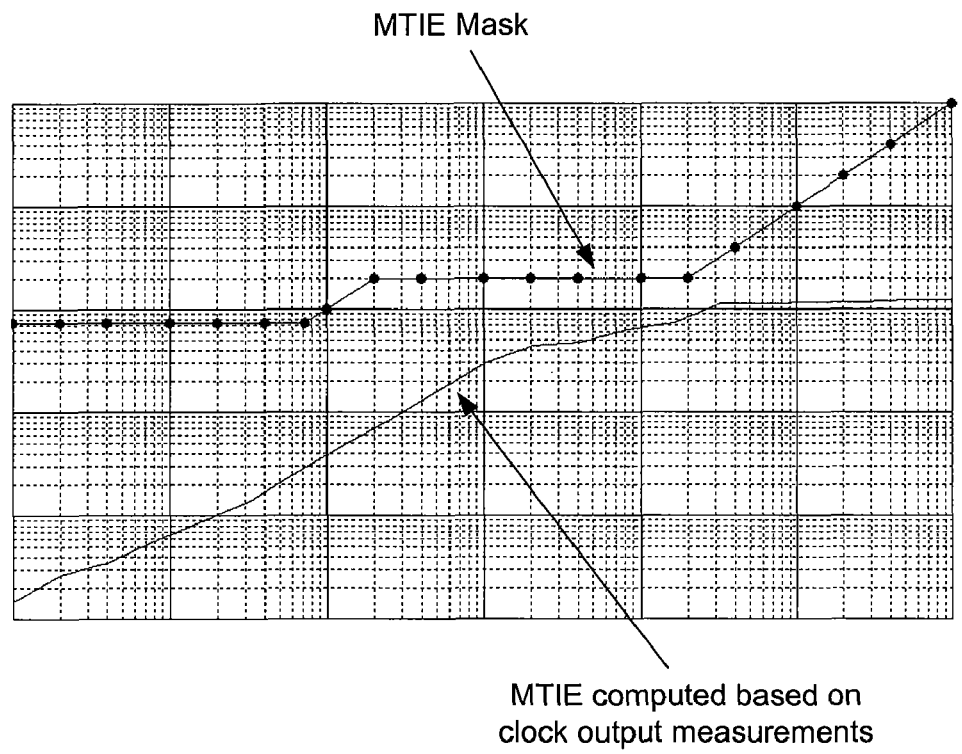
FIGS. 7 and 8 illustrate the use of masks for evaluating network performance in accordance with one or more embodiments of the invention.

An example of the graphical output of provided by the measurement equipment 630 is shown in FIG. 7. The x-axis represents time in log scale, and the y-axis represents the MTIE metric in log scale. In FIG. 7 the results of an MTIE calculation based on clock output measurements are shown. Also included in FIG. 7 is an MTIE mask that is for a wireless base-station timing application requiring a frequency accuracy of 1 ppb. It is clear from FIG. 7 that the computed MTIE curve lies entirely below the mask. When this happens, the clock output is said to "meet the Wireless 1 ppb MTIE mask."

Figure 8:
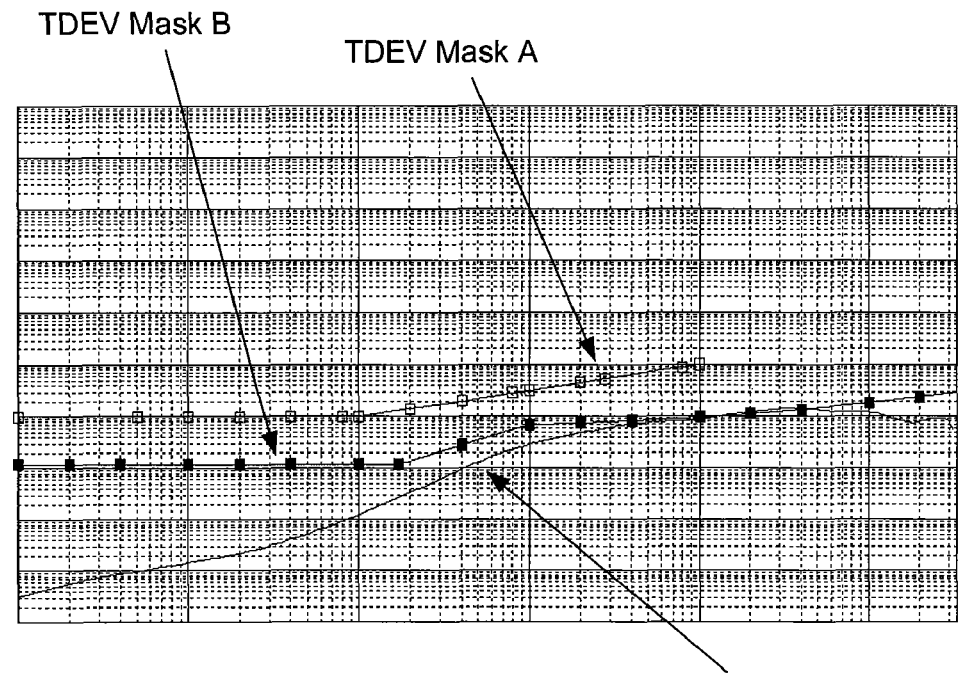

In some cases, it is the TDEV mask that needs to be met. FIG. 8 shows two masks for illustration purposes. The x-axis represents time in log scale, and the y-axis represents the TDEV metric in log scale. In this example, the clock output meets the looser TDEV mask A with considerable margin but fails the tighter TDEV mask B, albeit very narrowly.

When the master clock is located closer to the slave clock in the network, both of the computed MTIE and TDEV metrics are expected to decrease. Therefore, one way to comply with MTIE and TDEV masks is to add a master clock to the network and locate it closer to the slave clock being evaluated. Alternatively, an existing master clock may be moved to a location that is closer to the slave clock being evaluated. Of course, the latter option may adversely affect other slave clocks in the network.

Another way to comply with MTIE and TDEV masks is to provide for more accurate measurements. One way to do this is to increase the packet rate of the timing packets transmitted by the master clock. Another way is to employ a more sophisticated model for generating MTIE and TDEV metrics, such as the one described in U.S. Provisional Patent Application 61/318,170.

Still another way to comply with MTIE and TDEV masks is to employ a more advanced oscillator in the slave clocks, i.e., ones permitting noise filters with very long time constants. This design allows the oscillator to filter out lower frequency components of the deviations in the transit delay measurements. Ultimately, this shifts the pivot point, described below, to the right.

Figure 9:
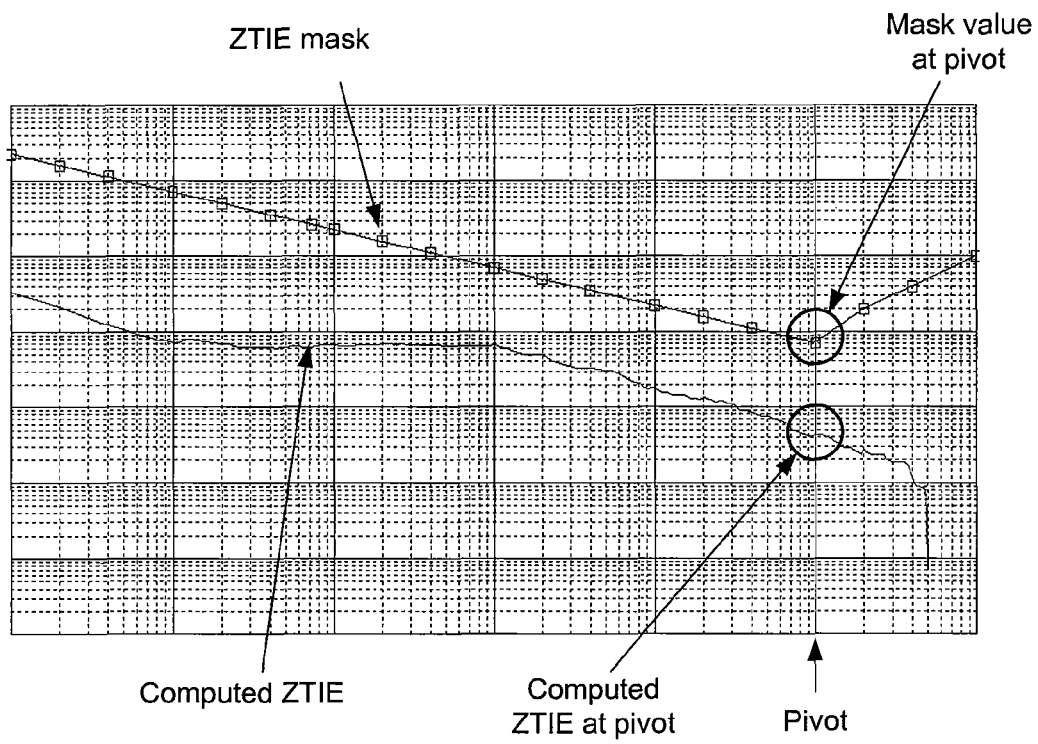
FIGS. 9 and 10 illustrate the use of mask values at pivot points for evaluating network performance in accordance with one or more embodiments of the invention.
Figure 10:
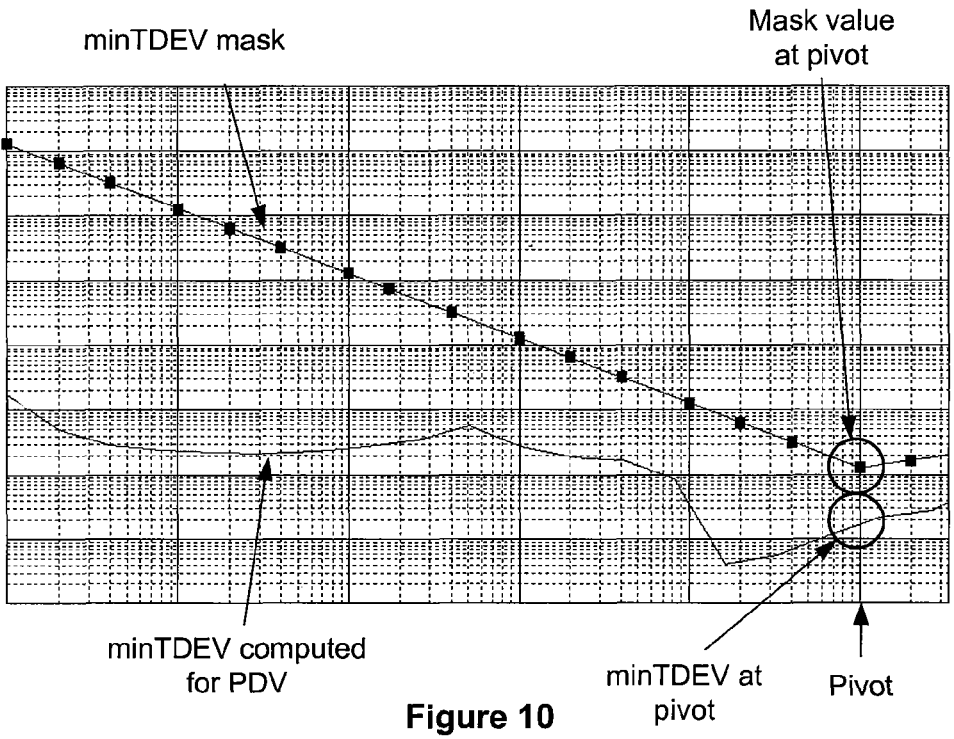

FIGS. 9 and 10 illustrate two other transit delay metrics which may provide guidance as to whether performance along a network segment may still be suitable although it did not satisfy the MTIE and/or TDEV masks. These metrics are known in the art as MATIE (or ZTIE) and minTDEV. If the computed MATIE/ZTIE metric lies entirely below the tolerance mask, as shown, there is high probability that the clock output will satisfy the MTIE requirement even though the MTIE metric may have failed the MTIE mask. In addition, if the computed minTDEV metric lies entirely below the tolerance mask, as shown, there is high probability that the clock output will satisfy the TDEV requirement even though the TDEV metric may have failed the TDEV mask.

For monitoring purposes it is advantageous if one measurement can be used to provide guidance as to whether the clock output mask requirement is being complied with. This is especially relevant if the slave device can, in actual operation, compute the metric at a given observation interval value. The development of the masks has been done in a manner to allow this particular mode of operation. Specifically, a pivot point is designated. In FIGS. 9 and 10, the pivot point is shown as t=10,000 sec (10 ksec). The mask value at this observation interval is depicted in FIGS. 9 and 10 by the upper circle and the computed value of the metric is also shown there by the lower circle. The rule is the following—if the computed value of the metric (ZTIE/minTDEV) at the pivot point is less than the mask value at the pivot point, then there is a very high probability that the slave clock output will meet the designated mask (MTIE/TDEV). It is possible for the slave device itself to estimate the value of the metric at the pivot point, and this could be reported to the network management system for verification, during in-service operation, as a way to confirm that the network parameters are within limits to support high-quality services such as real-time voice and/or video, circuit emulation, as well as timing distribution.

The metrics used for MTIE and TDEV based requirements considered above are ZTIE and minTDEV, respectively. The main reason for considering these metrics is that these metrics have been discussed in great detail in the standards community. There are other metrics that can be used that are more closely linked to the slave clock design. In particular, Symmetricom, Inc. has developed the metrics "PacketZTIE" and "PacketTDEV" specifically for providing additional insight into the behavior of slave clocks based on advanced designs developed by Symmetricom, Inc.

Masks based on TDEV can be generated in the following manner: First, denote the desired clock output TDEV requirement by $M(\tau)$ (e.g., TDEV Mask B in FIG. 8). This is "derated" by x dB to yield $m(\tau)$. That is, $$20.0 \cdot \log_{10}\left(\frac{M(\tau)}{m(\tau)}\right) = x$$

Here x>0 and a suitable value for x is 3 dB.

A pivot point, $T_P$, is chosen based on the expected design parameters of the slave clock device. For precision synchronization applications, a suitable value for pivot point is 10,000 sec (10 ksec). This value is appropriate when the device has a good local oscillator such as an OCXO. For less expensive, and therefore lower performance oscillators, a lower value of pivot point is required. For high performance TCXO (temperature controlled crystal oscillator) or a lower cost OCXOs, a suitable value for pivot point is 1000 sec (1 ksec). For slave implementations using cheap oscillators, the pivot must be reduced some more, probably to 100 sec or less. The mask, $\alpha(\tau)$, is constructed as:
  i. $\alpha(\tau)=m(\tau)$, for $\tau \geq T_P$.
  ii. For $\tau<T_P$, the tolerance mask follows a slope of −1 on the log-log scale used for TDEV plots.

Masks based on MTIE can be generated in the following manner: First, denote the desired clock output MTIE requirement by $M(\tau)$ (e.g., MTIE mask in FIG. 7). A pivot point, $T_P$, is chosen based on the expected design parameters of the slave clock device. For precision synchronization applications, a suitable value for pivot point is 10,000 sec (10 ksec). For less expensive, and therefore lower performance oscillators a lower value of pivot point is required. For high performance TCXO (temperature controlled crystal oscillator) or a lower cost OCXOs, a suitable value for pivot point is 1000 sec (1 ksec). For slave implementations using cheap oscillators, the pivot must be reduced some more, probably to 100 sec or less. The mask, $\beta(\tau)$, is constructed in the following manner. At observation interval value $\tau=T_P$, the tolerance mask is chosen as the output mask "derated" by x dB. That is, $$20.0 \cdot \log_{10}\left(\frac{M(t)}{\beta(t)}\right)_{t=T} = x$$

Here x>0 and a suitable value for x is 3 dB. Then for other values of $\tau$:
  i. $\beta(\tau)=M(\tau)$, for $t>T_P$. There will be a discontinuity at $t=T_P$ that can be resolved by making $\beta(\tau)=M(\tau)$ for $\tau \geq 2T_P$ and applying a simple straight line between $T_P$ and $2T_P$ to provide a mask that is piece-wise continuous.
  ii. For $\tau<T_P$, the tolerance mask follows a slope of −(½) on the log-log scale used for MTIE plots.

While the forgoing is directed to embodiments of the invention, other and further embodiments of the invention may be devised without departing from the basic scope thereof. For example, aspects of the invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the invention, are embodiments of the invention.

We claim:

1. A method of validating a network having one or more master clocks for packet-based timing transfer, comprising the steps of:
    transmitting timing packets throughout the network;
    receiving the timing packets at an evaluation node of the network;
    computing a transit delay characteristic of the network based on timing information contained in the received timing packets;
    generating a compliance mask for validating the network; and
    comparing the transit delay characteristic against the compliance mask and validating the network based on the comparison.

2. The method according to claim 1, further comprising the steps of:
    receiving the timing packets at a second evaluation node of the network;
    computing a second transit delay characteristic of the network based on timing information contained in the received timing packets;
    generating a second compliance mask for validating the network; and
    comparing the second transit delay characteristic against the second compliance mask and validating the network based on the comparison.

3. The method according to claim 2, wherein the network is validated as suitable if the computed transit delay characteristics do not exceed their respective compliance masks.

4. The method according to claim 1, further comprising:
    if the transit delay characteristic exceeds the compliance mask, inserting a new master clock in the network.

5. The method according to claim 1, further comprising:
    if the transit delay characteristic exceeds the compliance mask, relocating a master clock in the network.

6. The method according to claim 1, wherein the transit delay characteristic includes TDEV and MTIE and the compliance mask is one of a TDEV-based mask and a MTIE-based mask.

7. The method according to claim 1, wherein the transit delay characteristic is computed for a time interval of at least T seconds, and the comparison with the compliance mask for network validation is performed only at time T.

8. The method according to claim 7, further comprising:
    computing T based on a property of an oscillator used at the evaluation node.

9. The method according to claim 8,
if the transit delay characteristic exceeds the compliance mask at time T, replacing the oscillator used at the evaluation node so that T is increased.

10. A method of deploying a network having one or more masters and a plurality of slaves that are synchronized to the masters, comprising the steps of:
at each of the slaves, computing a transit delay metric and a compliance mask based on timing packets transmitted by the masters, and a pivot point based on a property of an oscillator used at the slave; and
upgrading the network upon determining that, at one of the slaves, the transit delay metric exceeds the compliance mask at the pivot point of said one of the slaves.

11. The method according to claim 10, wherein upgrading the network includes adding a master to the network.

12. The method according to claim 10, wherein upgrading the network includes relocating a master within the network.

13. The method according to claim 10, wherein upgrading the network includes upgrading an oscillator used at said one of the slaves.

14. The method according to claim 10, wherein the transit delay characteristic includes TDEV and MTIE and the compliance mask is one of a TDEV-based mask and a MTIE-based mask.

15. A packet network comprising:
one or more master clocks;
one or more slave clocks;
a plurality of network elements between the master clocks and the slave clocks; and
a network management system coupled to each of the master clocks, the slave clocks, and the network elements, the network management system being configured to generate transit delay metrics and compliance masks at the slave clocks for active monitoring of the packet network performance.

16. The packet network according to claim 15, further comprising a packet probe device co-located in the packet network with one of the slave clocks.

17. The packet network according to claim 16, wherein the packet probe device is coupled to an accurate timing reference.

18. The packet network according to claim 17, wherein the network management system computes the transit delay metric for the slave clock co-located with the packet probe device for a time interval of at least T seconds, and evaluates the transit delay metric at time T against a value of the compliance mask of the slave clock at time T, wherein T is determined from a property of an oscillator used at the slave clock.

19. The packet network according to claim 15, wherein the network management system determines a rate at which timing packets are generated by the master clocks based on the transit delay metrics and the compliance masks.

\* \* \* \* \*